C. F. RUKES.
BEET TOPPER.
APPLICATION FILED JULY 18, 1917.
1,268,388.
Patented June 4, 1918.
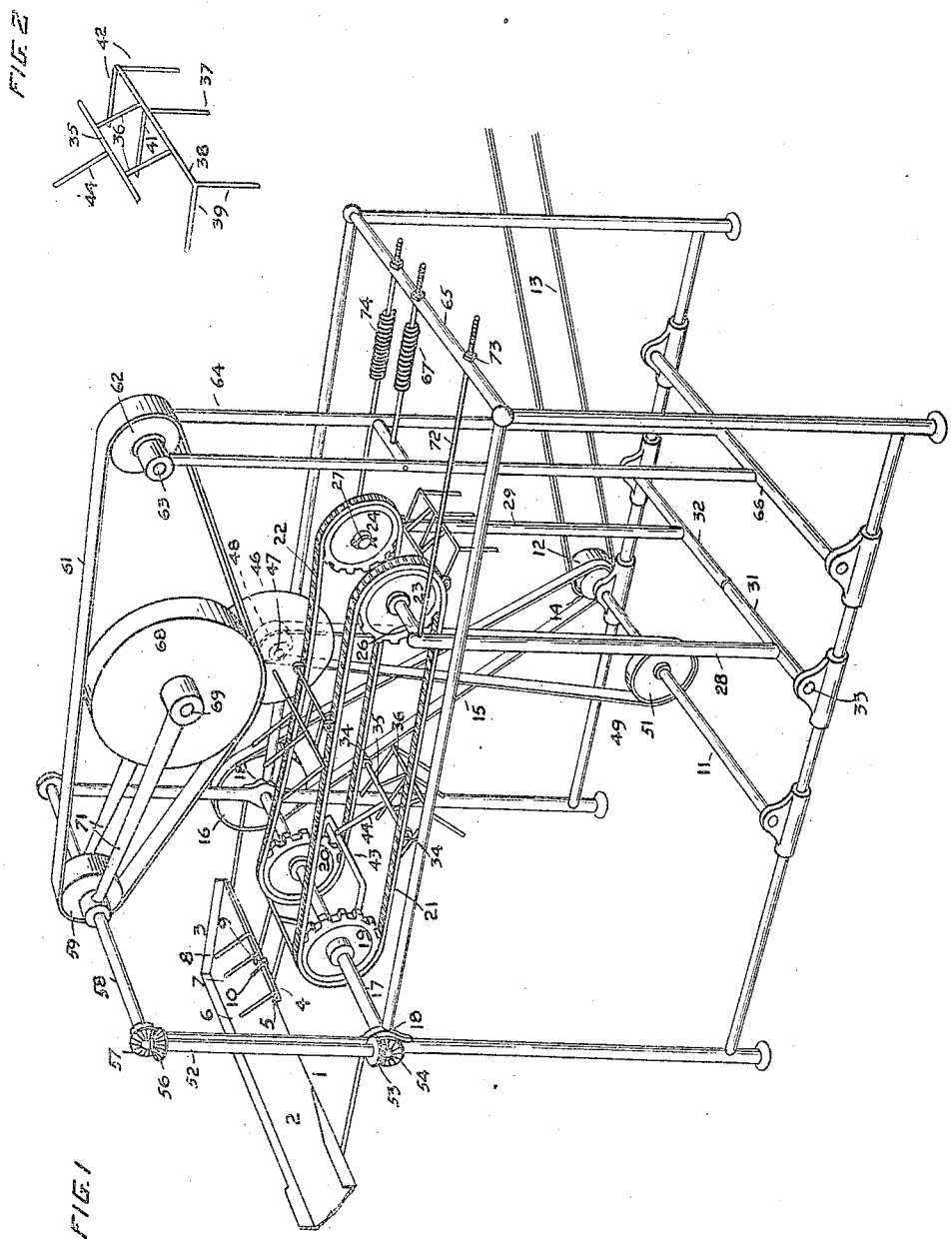
INVENTOR
C. F. RUKES

UNITED STATES PATENT OFFICE.

CHARLES F. RUKES, OF PALO ALTO, CALIFORNIA.

BEET-TOPPER.

1,268,388.  Specification of Letters Patent.  Patented June 4, 1918.

Application filed July 18, 1917. Serial No. 181,257.

*To all whom it may concern:*

Be it known that I, CHARLES F. RUKES, a citizen of the United States, residing at Palo Alto, in the county of San Mateo and State of California, have invented new and useful Improvements in Beet-Toppers, of which the following is a specification.

The object of the present invention is to provide a machine for topping beets automatically which will present the beets to the topping cutter in exactly the direction in which the cutter will cut off the top of the beet squarely.

In the accompanying drawing, Figure 1 is a perspective view of a beet topper constructed in accordance with my invention; Fig. 2 is a similar view of a carrying frame thereof, detached.

It will be understood that my improved machine will, in general, be carried on a vehicle drawn by horses or by a tractor, and which has mechanism for uprooting the beets, an elevator being provided to elevate the beets so uprooted to a suitable chute, but such mechanism elevator and chute form no part of the present invention, and therefore the illustration thereof is omitted. In fact, the topping machine can also be stationary and the beets, with the tops attached thereto, can be transported thereto to be topped.

The chute, heretofore mentioned, delivers the beets on to a tray or table 1 having a flange 2 on its rear side and an end, and a man stands behind this table and takes the beets as they come in succession and deposits them upon a stationary guide frame 3. This guide frame 3 comprises a rear bar 4, which is secured, as shown at 5, to the rear edge of the table, and tines or forks 6, 7, 8, which extend from the bar 4, in an angular or V-shaped form, the tines 7, 8, being closer to each other than the tines 6, 7. The thick part of the beet rests between the tines 7, 8, and the thin part or tail of the beet is supported by the tines 6, 7, and rests between them. The foliage of the beet projects out beyond the tine 8. Upon the bar 4 is adjustably secured, by a set screw 9, a finger 10, which indicates to the operator the part of the beet, when laid on said guide frame, where the cut will be made to top the beet, so that the operator will be guided in placing the beet upon the guide frame, to so place it that the cut will be made at the proper point.

11 indicates a shaft, carrying a pulley 12 driven by a belt 13 from any suitable source of power, and also carrying a pulley 14 around which is a belt 15 traveling around a pulley 16 on a shaft 17 mounted in suitable bearings 18 and carrying thereon, keyed thereto, sprocket wheels 19, 20, around which travel sprocket chains 21, 22, traveling also around sprocket wheels 23, 24, mounted on shafts 26, 27, carried by frames 28, 29, secured to tubes 31, 32, on a shaft 33. On said sprocket chains 21, 22, are secured at suitable intervals bearings 34 for the terminal portions of transverse shafts 35, extending between the two sprocket chains. From each shaft extend rods 36, the outer ends of which are secured to a V-shaped frame 37. Each frame 37 comprises a central transverse bar 38 secured to the outer ends of said rods 36 and three pairs of diverging rods 39, 41, 42, the rods of each pair diverging from each other at about a right angle, said rods 39, 41, 42, extending in planes making with the plane of the rods 36 and bars 38 angles of about 45° and 135° respectively.

It will be seen that each frame, when traveling with the lower flight of the chains, 21, 22, hangs down therefrom, so that the rods 36 are almost vertical.

Around the shaft 17 extends a cam 43, against the front lower edge of which cam, as the chain advances, impinges the end of a finger 44 rigidly secured to the shaft 35 and extending upwardly therefrom. Against said cam the front end of said finger rests while the chains continue to move toward the shaft 17 and thereby cause the shaft 35 to turn, thereby turning the frame 37 upwardly and forwardly, the free end of the finger 44 eventually traveling around the under side of the cam 43 and following behind the frame 37. Thereby the frame is caused to travel around the sprocket wheels 19, 20, in a position in which both members of the pairs of diverging rods 39, 41, 42, extend upwardly. In this position they pass between the tines 6, 7, 8, of the stationary guide frame 3 and lift the beet therefrom.

As the traveling frame 37 passes above and away from the sprocket wheels 19, 20, the finger 43 leaves the cam 44, and the frame 37 now drops to a position in which the transverse bar 38 rests upon the upper portions of the chain 21, 22, to the rear of the shaft 35, the frame 37 still carrying the beet.

The beet is now brought to the topping position. For this purpose there is provided a circular cutter 46 on a shaft 47 carrying a pulley 48 around which travels a belt 49, traveling also around a pulley 51 on the shaft 11. By said shaft 11, therefore, a rapid rotary motion is imparted to said circular cutter, and the top of the beet is cut off thereby, as the beet travels past the edge of the cutter with the frame.

In order to hold the beet securely in the frame while the top is being cut off, there is provided a vertical shaft 52 having on its lower end a miter gear 53, which meshes with a miter gear 54 upon the shaft 17 and on its upper end a miter gear 56 which meshes with a miter gear 57 on a shaft 58 carrying a pulley 59 around which travels a belt 61 which also travels around a pulley 62 on a shaft 63 carried by a suitable frame 64 having at its lower end a fixed pivot 66. A coiled spring 67 attached at one end to said frame 64 and at the other end to a frame 65, maintains the belt taut. Said belt 61 also travels around a heavy cylindrical weight or roller 68 rotatable on a shaft 69 mounted in ends of arms 71, the other ends of which are supported on the shaft 58, so that said cylindrical weight causes the belt 61 to bear down upon the beet and to press said beet down into the middle portion of the frame and hold said beet firmly against the circular cutter.

The chain 21, which supports the lower or tail portion of the beet, is held taut; and the frame 28 is adjusted, by means of a bar 72 which passes through the frame 65 and has a nut 73 screwed thereon. By this arrangement any desired constant tension may be given to the sprocket chain 21. But it is important that the sprocket chain 22 should be flexible to fit the different sizes of beets. For it is necessary that the central line of the beet when being topped should be horizontal. If the chain 22 were maintained always on the same level, then, while a small beet might be topped properly, that is, the topping cut made square across the beet, yet a thick beet would not be topped properly, for its axis would not be horizontal, and therefore the cut would be made obliquely across the beet. A square cut can only be made in all cases if the central line of the beet is maintained horizontally. In order to so maintain the central line of the beet horizontal it must be arranged that the chain 22 should be depressed and the roller 68 should be raised for a thick beet, whereas for a thin beet the chain 22 will rise somewhat from its normal position, and the roller 68 should correspondingly descend from its normal position. It is for this reason that the spring 67 is provided to assist the weight to rise when a thick beet is passing, and for the same reason there is provided a spring 74 connected at one end to the frame 65 and at the other end to the frame 29 carrying the bearing of the shaft 27, which carries the sprocket wheel 24. With this construction, when a thin beet is passing and therefore comparatively little pressure is exerted on the beet by the chain below and the roller above, then the spring 74 operates to tighten the chain 24 and raise up the lower side of the beet so that its central line is horizontal and the cut takes place square across the beet.

The two springs 67 and 74, which act respectively on the belt 61 and the sprocket chain 22, equalize each other and maintain the beet at all times in a position in which its central line extends horizontally, the purpose of the roller 68 being to hold down the beet while it is being cut.

I claim:

1. In a beet topping machine, a stationary frame for supporting the beets in succession, endless chains, conveyer frames carried thereby, adapted to lift the beets from the stationary frame, and an endless belt and roller supported by said belt, and capable of, and restricted to an oscillating and approximately vertical movement, and depressing said belt upon said beets in succession in said conveyer frames.

2. In a beet topper, the combination of endless belts, conveyer frames carried thereby, means for varying the tension of one of said belts, and resilient means for varying the tension of the other belt with the variation of the load imposed thereon.

3. In a beet topping machine, the combination of endless belts, conveyer frames for the beets carried thereby, one of said belts when in operation being under a uniform tension, and means for varying the tension of the other belt to conform to the variation of the load thereon.

4. In a beet topping machine, the combination of endless belts and conveyer frames carried thereby, sprocket wheels around which said belts pass, a movable frame for supporting one wheel of each chain, means attached to one of said frames for varying the tension of the chain thereon, a spring attached to the other movable frame for automatically varying the tension of the chain around the wheel carried thereby, with the load thereon, an endless belt above said chains traveling along a path which approaches that traveled by the beets in said conveyer frames, and a roller on said endless belt for pressing the beets into the conveyer frames.

5. In a beet topping machine, the combination of endless belts and conveyer frames carried thereby, sprocket wheels around which said belts pass, a movable frame for supporting one wheel of each chain, means attached to one of said frames for varying the tension of the chain thereon, a spring attached to the other movable frame for automatically varying the tension of the chain around the wheel carried thereby with the load thereon, an endless belt above said chains traveling along a path which approaches that traveled by the beets in said conveyer frames, a roller on said endless belt for pressing the beets into the conveyer frames, a pulley around which said endless belt travels, a movable frame carrying said pulley and a spring attached to said frame and arranged to extend said belt against the weight of said roller.

CHARLES F. RUKES.

Copies of this patent may be obtained for five cents each, by addressing the "Commissioner of Patents Washington, D. C."